(12) United States Patent
Yang et al.

(10) Patent No.: US 10,090,942 B2
(45) Date of Patent: Oct. 2, 2018

(54) METHOD FOR TRANSMITTING RADIO LINK MEASUREMENT FOR MTC AND APPARATUS THEREFOR

(71) Applicant: LG ELECTRONICS INC., Seoul (KR)

(72) Inventors: Suckchel Yang, Seoul (KR); Joonkui Ahn, Seoul (KR); Yunjung Yi, Seoul (KR); Hyangsun You, Seoul (KR); Bonghoe Kim, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 14/909,648

(22) PCT Filed: Aug. 4, 2014

(86) PCT No.: PCT/KR2014/007180
§ 371 (c)(1),
(2) Date: Feb. 2, 2016

(87) PCT Pub. No.: WO2015/020378
PCT Pub. Date: Feb. 12, 2015

(65) Prior Publication Data
US 2016/0183112 A1    Jun. 23, 2016

Related U.S. Application Data

(60) Provisional application No. 61/861,971, filed on Aug. 3, 2013.

(51) Int. Cl.
H04W 24/08    (2009.01)
H04B 17/18    (2015.01)
(Continued)

(52) U.S. Cl.
CPC ............ *H04B 17/18* (2015.01); *H04B 17/00* (2013.01); *H04L 5/0053* (2013.01);
(Continued)

(58) Field of Classification Search
CPC ....... H04B 17/00; H04L 5/0053; H04L 5/006; H04L 5/0082; H04W 24/08; H04W 4/005
See application file for complete search history.

(56) References Cited

U.S. PATENT DOCUMENTS

2011/0143675 A1    6/2011  Damnjanovic et al.
2011/0250919 A1*  10/2011  Barbieri ............... H04L 1/0026
                                                    455/509

(Continued)

FOREIGN PATENT DOCUMENTS

WO    WO 2011/130665 A1    10/2011

OTHER PUBLICATIONS

3GPP, 3rd Generation Partnership Project; Technical Specification Group Radio Access Network; Study on provision of low-cost Machine-Type Communications (MTC) User Equipments (UEs) based on LTE (Release 12), 3GPP TR 36.888 V12.0.0, Jun. 2013, pp. 1-55.

(Continued)

*Primary Examiner* — Asad Nawaz
*Assistant Examiner* — Zhaohui Yang
(74) *Attorney, Agent, or Firm* — Birch, Stewart, Kolasch & Birch, LLP (57) ABSTRACT

The present invention relates to a wireless communication system. Specifically, the present invention relates to a method and an apparatus for a terminal to monitor a radio link in a wireless communication system, the method comprising: a step for receiving a radio frame including a plurality of subframes; a step for generating measurement results on the basis of the signal in the radio frame; and a (Continued)

* If repetition is applied to PDCCH transmission, the measurement result is generated on the basis of the combined signal of the L subframes (L > 1).
* If repetition is not applied to PDCCH transmission, the measurement result is generated on the basis of signal of the single subframe.

step for evaluating the state of the radio link of the radio frame by comparing the measurement results with one or more threshold values, wherein if a repetition is applied to a physical downlink control channel (PDCCH) transmission, the measurement results are generated on the basis of the combined signal in L (L>1) subframes, and if the repetition is not applied to the PDCCH transmission, the measurement results are generated on the basis of the signal in a single subframe.

6 Claims, 9 Drawing Sheets

(51) Int. Cl.
*H04B 17/00* (2015.01)
*H04L 5/00* (2006.01)
*H04W 4/70* (2018.01)

(52) U.S. Cl.
CPC ............. *H04L 5/0082* (2013.01); *H04W 4/70* (2018.02); *H04W 24/08* (2013.01); *H04L 5/006* (2013.01)

(56) References Cited

U.S. PATENT DOCUMENTS

| | | |
|---|---|---|
| 2012/0281548 A1 | 11/2012 | Lin et al. |
| 2013/0163543 A1* | 6/2013 | Freda ................ H04W 72/0406 370/329 |
| 2016/0182208 A1* | 6/2016 | Yi ......................... H04L 1/0026 370/329 |

OTHER PUBLICATIONS

Alcatel-Lucent et al., "(E)PDCCH Coverage Extension for MTC Devices," 3GPP TSG-RAN WG1 Meeting #72bis, R1-130941, Chicago, USA, Apr. 15-19, 2013, 4 pages.

* cited by examiner

: CRS for antenna port p (p∈0, p∈0,1 or p∈0,1,2,3)

FIG. 10

* If repetition is applied to PDCCH transmission, the measurement result is generated on the basis of the combined signal of the L subframes (L > 1).
* If repetition is not applied to PDCCH transmission, the measurement result is generated on the basis of signal of the single subframe.

FIG. 11

* If repetition is applied to PDCCH transmission, measurement information is generated on the basis of the combined signal of several subframes.
* If repetition is not applied to PDCCH transmission, measurement information is generated on the basis of signal of single subframe

FIG. 12

METHOD FOR TRANSMITTING RADIO LINK MEASUREMENT FOR MTC AND APPARATUS THEREFOR

CROSS REFERENCE TO RELATED APPLICATIONS

This application is the National Phase of PCT/KR2014/007180 filed on Aug. 4, 2014, which claims priority under 35 U.S.C. 119(e) to U.S. Provisional Application No. 61/861,971 filed on Aug. 3, 2013, all of which are hereby expressly incorporated by reference into the present application.

TECHNICAL FIELD

The present invention relates to a method and apparatus for performing radio link measurement in a wireless communication system, and more particularly to a method and apparatus for performing radio link measurement for Machine Type Communication (MTC).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

DISCLOSURE

Technical Problem

An object of the present invention is to provide a method and apparatus for efficiently performing radio link measurement in a wireless communication system. More specifically, embodiments of the present invention relate to a method for efficiently performing radio link measurement for MTC, and a method and apparatus for performing signaling.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method for monitoring a radio link by a user equipment (UE) in a wireless communication system including: receiving a radio frame including a plurality of subframes; generating a measurement result on the basis of a signal on the radio frame; and estimating a radio link state of the radio frame by comparing the measurement result with at least one threshold value. If repetition is applied to PDCCH (Physical Downlink Control Channel) transmission, the measurement result is generated on the basis of a combined signal on L subframes (where L>1), and if the repetition is not applied to the PDCCH transmission, the measurement result is generated on the basis of a signal on a single subframe.

In another aspect of the present invention, a user equipment (UE) on a wireless communication system includes: a radio frequency (RF) unit; and a processor, wherein the processor receives a radio frame including a plurality of subframes, generates a measurement result on the basis of a signal on the radio frame, and estimates a radio link state of the radio frame by comparing the measurement result with at least one threshold value. If repetition is applied to PDCCH (Physical Downlink Control Channel) transmission, the measurement result is generated on the basis of a combined signal on L subframes (where L>1), and if the repetition is not applied to the PDCCH transmission, the measurement result is generated on the basis of a signal on a single subframe.

L may be identical to the number of repetition times of the PDCCH transmission.

The L subframes may be identical to a subframe set configured in a manner that PDCCH transmission is repeated.

The combined signal may include a signal obtained by combining signals on the L subframes in a modulation symbol state.

The measurement result is generated using an expression {signal term/interference term}.

If repetition is applied to PDCCH transmission, the signal term is determined using a power value related to the combined signal on the L subframes. The interference term may be determined on the basis of a resultant value obtained by adding interference power values of respective subframes throughout the L subframes.

Advantageous Effects

As is apparent from the above description, the embodiments of the present invention can efficiently performing radio link measurement in a wireless communication system. More specifically, the embodiments of the present invention can provide a method for efficiently performing radio link measurement for MTC.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.16m system) without restriction.

Figure 1:
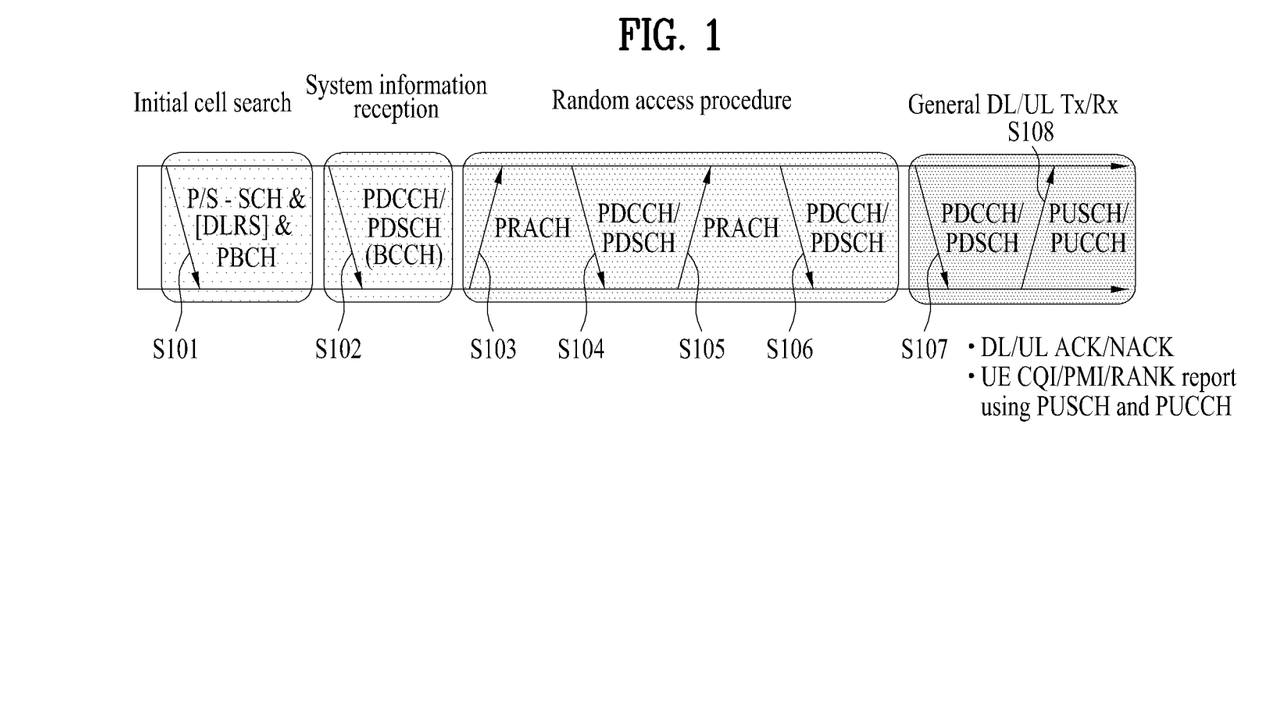
FIG. 1 illustrates physical channels and a general signal transmission method using the physical channels in a Long Term Evolution(-Advanced) (LTE-(A)) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
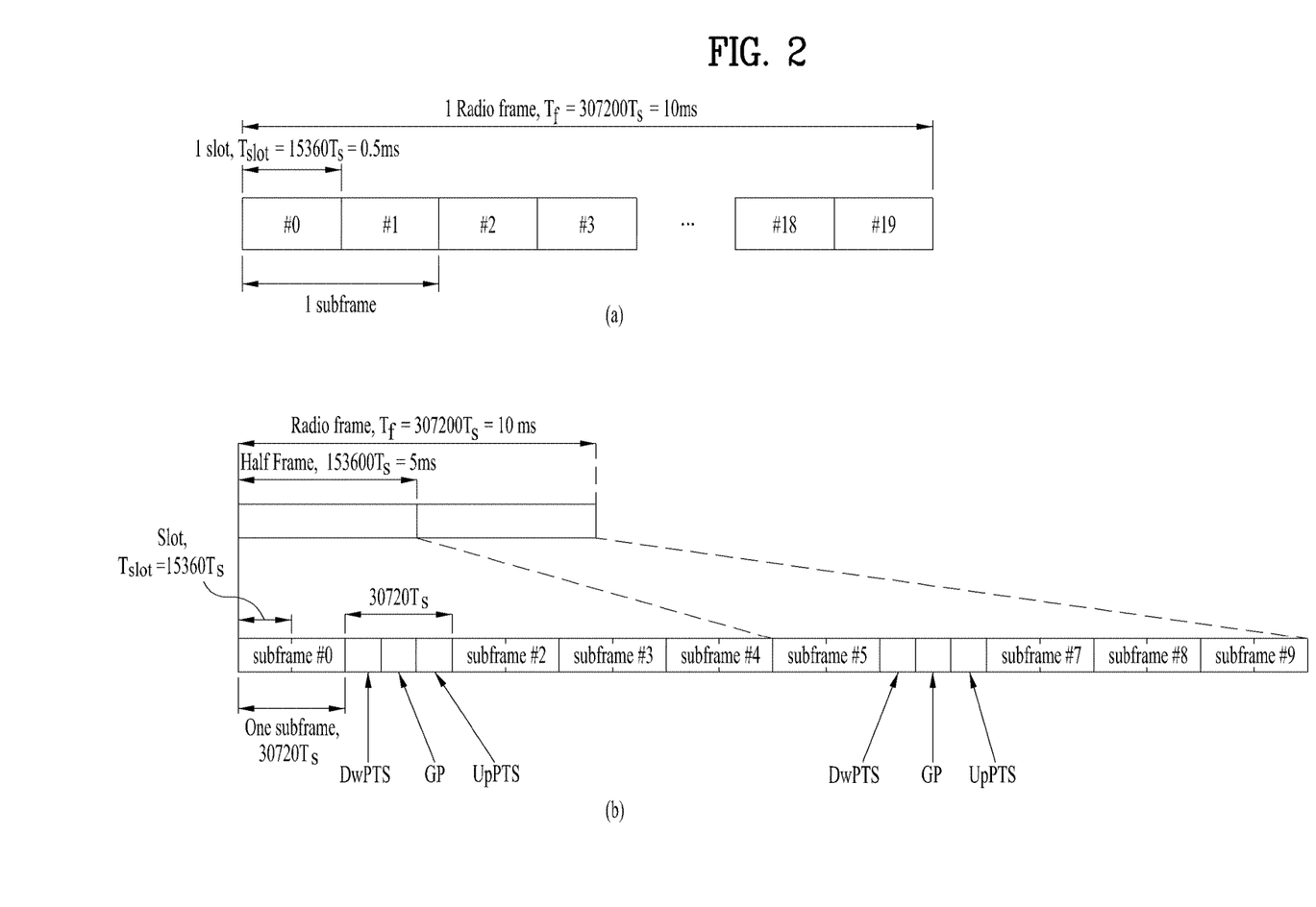
FIG. 2 illustrates a radio frame structure in the LTE(-A) system.

FIG. 2 illustrates a radio frame structure in the LTE(-A) system. The 3GPP LTE standards support a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. An FDD radio frame includes only DL subframes or only UL subframes. The radio frame includes 10 subframes, each subframe including two slots in the time domain. One subframe may be 1 ms long and one slot may be 0.5 ms long. One slot includes a plurality of (DL) OFDM symbols or a plurality of (UL) SC-FDMA symbols in the time domain. Unless specifically mentioned, "OFDM symbol" or "SC-FDMA" symbol may be referred to simply as "symbol" (hereinafter referred to as 'sym').

FIG. 2(b) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). In the special subframe, DwPTS is used for initial cell search, synchronization, or channel estimation at a UE. UpPTS is used for an eNB to perform channel estimation and acquire UL synchronization with a UE. The GP is used to cancel UL interference between a UL and a DL, caused by the multi-path delay of a DL signal. A subframe includes two slots.

[Table 1] lists exemplary subframe configurations for a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In [Table 1], D represents a DL subframe, U represents a UL subframe, and S represents a special subframe.
In [Table 1], D represents a DL subframe, U represents a UL subframe, and S represents a special subframe.

Figure 3:
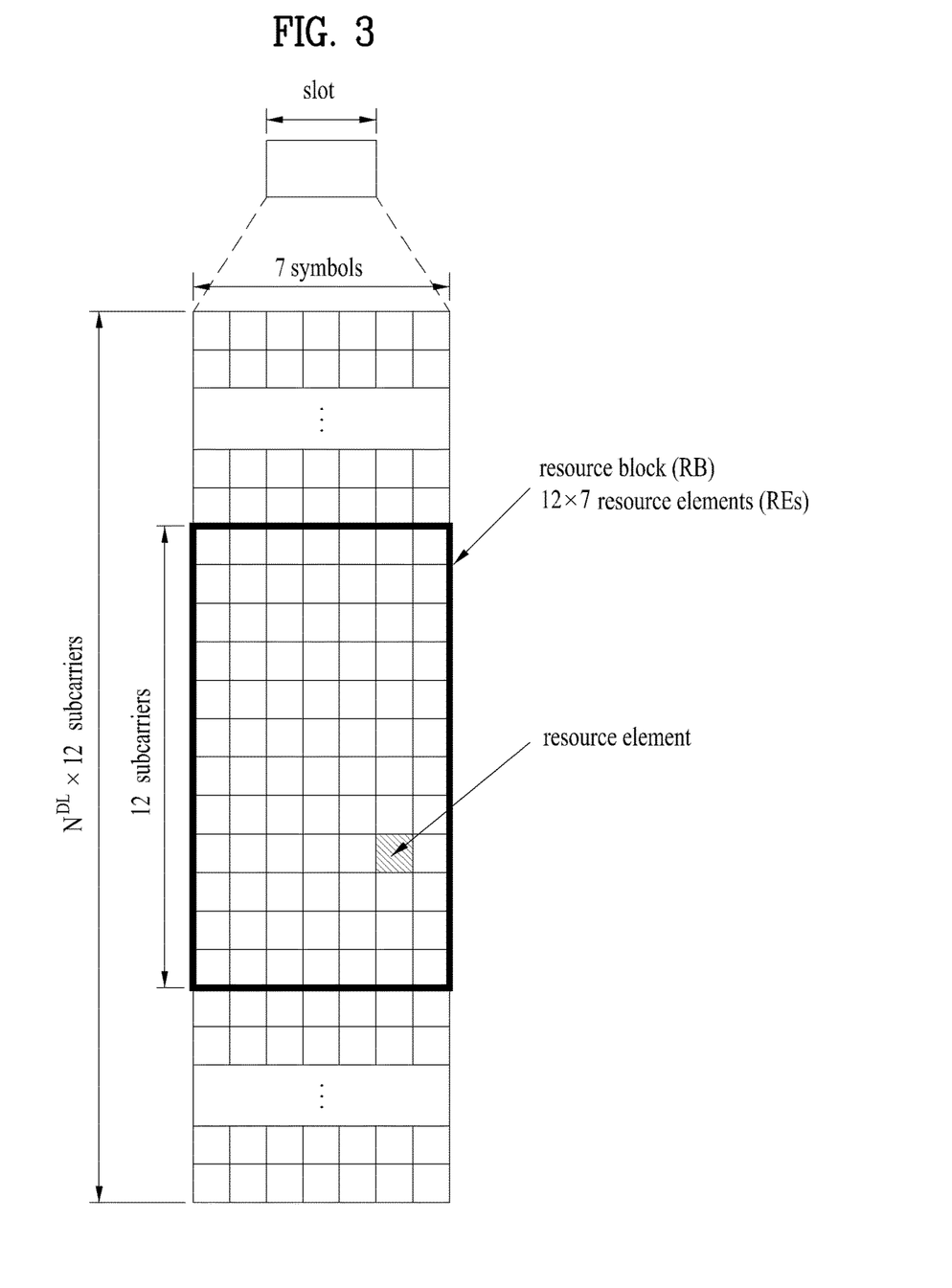
FIG. 3 illustrates a resource grid for the duration of a slot.

FIG. 3 illustrates a resource grid for the duration of one slot. A slot includes a plurality of symbols (e.g., OFDM symbols or SC-FDMA symbols), for example, 6 or 7 symbols in the time domain by a plurality of Resource Blocks (RBs) in the frequency domain. Each RB includes 12 subcarriers. Each element of a resource grid is called a Resource Element (RE). The RE is a minimum resource unit for signal transmission and one modulation symbol is mapped to an RE.

Figure 4:
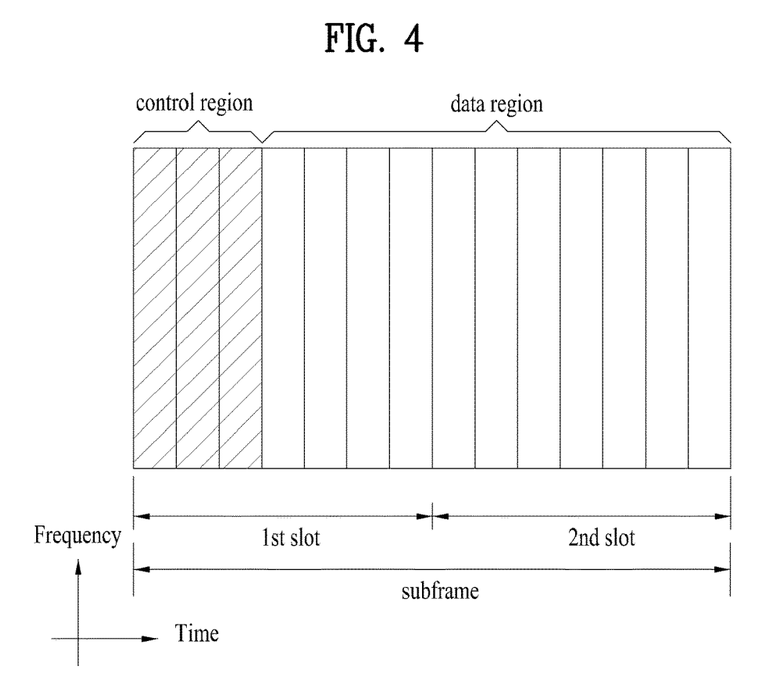
FIG. 4 illustrates an exemplary Downlink (DL) SubFrame (SF) structure.

FIG. 4 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PCFICH), a PDCCH, a Physical Hybrid automatic repeat request (ARQ) Indicator Channel (PHICH), etc. The PCFICH is located in the first OFDM symbol of a subframe, carrying information about the number of OFDM symbols used for transmission of control channels in the subframe. The PHICH occupies 4 RE Groups (REGs) distributed equally in the control region based on a cell Identifier (ID). The PCFICH indicates a value ranging 1 to 3 (or 2 to 4) and is modulated in Quadrature Phase Shift Keying (QPSK). The PHICH delivers an HARQ ACKnowledgment/Negative ACKnowledgment (ACK/NACK) signal as a response to a UL transmission. The PHICH is allocated to the remaining REGs of one or more OFDM symbols corresponding to a PHICH duration, except for REGs carrying Cell-specific Reference Signals (CRSs) and the PCFICH (the first OFDM symbol). The PHICH is allocated to 3 REGs distributed as much as possible in the frequency domain.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of available bits for the PDCCH are determined according to the number of CCEs.

[Table 2] lists the number of CCEs, the number of REGs, and the number of PDCCH bits for each PDCCH format.

TABLE 2

| PDCCH format | Number of CCEs (n) | Number of REGs | Number of PDCCH bits |
|---|---|---|---|
| 0 | 1 | 9  | 72  |
| 1 | 2 | 18 | 144 |
| 2 | 4 | 36 | 288 |
| 3 | 8 | 72 | 576 |

The CCEs may be numbered consecutively and a PDCCH having a format with n CCEs may start only at a CCE with an index being a multiple of n. The number of CCEs used for transmission of a specific PDCCH is determined according to a channel condition by an eNB. For example, if the PDCCH is for a UE having a good DL channel (e.g., a UE near to the eNB), one CCE may be sufficient for the PDCCH. On the other hand, if the PDCCH is for a UE having a poor channel (e.g., a UE near to a cell edge), 8 CCEs may be used for the PDCCH in order to achieve sufficient robustness. In addition, the power level of the PDCCH may be controlled according to the channel condition.

Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) request, an HARQ process number, a Transmitted Precoding Matrix Indicator (TPMI), Precoding Matrix Indicator (PMI) confirmation, etc.

An eNB determines a PDCCH format according to control information to be transmitted to a UE and adds a Cyclic Redundancy Check (CRC) to the control information, for error detection. The CRC is masked by an ID (e.g., a Radio Network Temporary Identifier (RNTI) according to the owner or usage of a PDCCH. In other words, the PDCCH is CRC-scrambled with the ID (e.g., the RNTI).

[Table 3] lists exemplary IDs by which a PDCCH is masked.

TABLE 3

| Type | Identifier | Description |
|---|---|---|
| UE-specific | C-RNTI, TC-RNTI, SPS C-RNTI | used for a unique UE identification |
| Common | P-RNTI | used for paging message |
| | SI-RNTI | used for system information |
| | RA-RNTI | used for random access response |

If a C-RNTI, a Temporary C-RNTI (TC-RNTI), and a Semi-Persistent Scheduling C-RNTI (SPS C-RNTI) are used, the PDCCH delivers UE-specific control information for a specific UE. If other RNTIs are used, the PDCCH delivers common control information for all UEs in a cell.

The LTE(-A) standard defines the CCE positions of a limited set (equivalent to a limited CCE set or a limited PDCCH candidate set) in which a PDCCH may be located, for each UE. The CCE positions of a limited set that a UE should monitor to detect a PDCCH directed to the UE may be referred to as a Search Space (SS). Monitoring includes decoding each PDCCH candidate (blind decoding). A UE-specific Search Space (USS) and a Common Search Space (CSS) are defined. A USS is configured on a UE basis and a CSS is configured commonly for UEs. The USS and the CSS may be overlapped. The starting position of the USS hops between subframes UE-specifically. An SS may have a different size according to a PDCCH format.

[Table 4] lists CSS sizes and USS sizes.

TABLE 4

| PDCCH format | Number of CCEs (n) | Number of PDCCH candidates in CSS | Number of PDCCH candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To place computation load under control according to the total number of Blind Decodings (BDs), a UE is not required to detect all defined DCI formats at the same time. In general, the UE always detects formats 0 and 1A in a USS. Formats 0 and 1A have the same size and are distinguished from each other by a flag in a message. The UE may be required to receive an additional format (e.g., format 1, 1B, or 2 according to a PDSCH Transmission Mode (TM) configured by an eNB). The UE detects formats 1A and 1C in a CSS. The UE may further be configured to detect format 3 or 3A. Formats 3 and 3A have the same size as formats 0 and 1A and may be identified by scrambling a CRC with different IDs (or a common ID), instead of UE-specific IDs.

PDSCH transmission schemes according to TMs and information content of DCI formats are given as follows.

TMs
  TM 1: transmission from a single eNB antenna port
  TM 2: transmit diversity
  TM 3: open-loop spatial multiplexing
  TM 4: closed-loop spatial multiplexing
  TM 5: Multi-User Multiple Input Multiple Output (MU-MIMO)
  TM 6: closed-loop rank-1 precoding
  TM 7: single-antenna port (port 5) transmission
  TM 8: double-layer transmission (port 7 and port 8) or single-antenna port (port 7 or port 8) transmission
  TMs 9 and 10: up to 8-layer transmission (port 7 to port 14) or single-antenna port (port 7 or port 8) transmission DCI Formats
  format 0: resource grant for PUSCH transmission
  format 1: resource allocation for single-codeword PDSCH transmission (TMs 1, 2 and 7)
  format 1A: compact signaling of resource allocation for single-codeword PDSCH (all modes)
  format 1B: compact resource allocation for PDSCH (mode 6) using rank-1 closed-loop precoding
  format 1C: very compact resource allocation for PDSCH (e.g., paging/broadcast system information)
  format 1D: compact resource allocation for PDSCH using MU-MIMO (mode 5)
  format 2: resource allocation for PDSCH of closed-loop MIMO operation (mode 4)
  format 2A: resource allocation for PDSCH of open-loop MIMO operation (mode 3)
  format 3/3A: power control command having 2-bit/1-bit power control value for PUCCH and PUSCH
  format 4: resource grant for PUSCH transmission in a cell set to multi-antenna port transmission mode DCI formats may be classified into a TM-dedicated format and a TM-common format. The TM-dedicated format is a DCI format configured for a corresponding TM only, and the TM-common format is a DCI format configured commonly for all TMs. For example, DCI format 2B may be a TM-dedicated DCI format for TM 8, DCI format 2C may be a TM-dedicated DCI format for TM 9, and DC1 format 2D may be a TM-dedicated DCI format for TM 10. DCI format 1A may be a TM-common DCI format.

Figure 5:
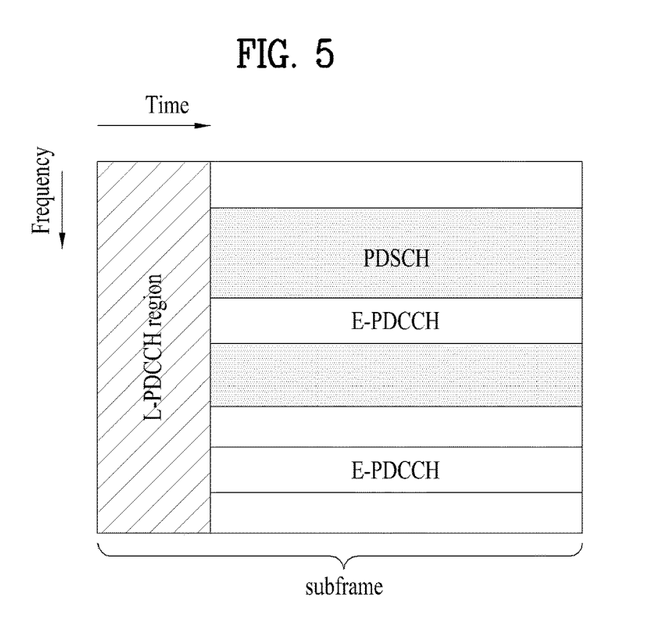
FIG. 5 illustrates an example of allocating Enhanced Physical Downlink Control Channels (E-PDCCHs) to an SF.

FIG. 5 illustrates an example of allocating Enhanced PDCCHs (E-PDCCHs) to a subframe. A legacy LTE system has limitations such as transmission of a PDCCH in limited OFDM symbols. Accordingly, LTE-A has introduced the E-PDCCH for more flexible scheduling.

Referring to FIG. 5, a PDCCH conforming legacy LTE (-A) (referred to as a legacy PDCCH or L-PDCCH) may be allocated to a control region (refer to FIG. 4). An L-PDCCH region means a region to which an L-PDCCH may be allocated. The L-PDCCH region may refer to a control region, a control channel resource region (i.e., CCE resources) to which a PDCCH may be actually allocated, or a PDCCH SS depending on the context. A PDCCH may be additionally allocated to a data region (refer to FIG. 4). The PDCCH allocated to the data region is referred to as an E-PDCCH. As illustrated in FIG. 5, a scheduling constraint imposed by the limited control channel resources of the L-PDCCH region may be relieved by additionally securing control channel resources through the E-PDCCH. An E-PDCCH and a PDSCH are multiplexed in Frequency Division Multiplexing (FDM) in the data region.

Specifically, the E-PDCCH may be detected/demodulated based on DM-RS. The E-PDCCH is transmitted in a Physical Resource Block (PRB) pair along the time axis. If E-PDCCH-based scheduling is configured, a subframe in which an E-PDCCH will be transmitted/detected may be indicated. The E-PDCCH may be configured only in a USS. A UE may attempt to detect DCI only in an L-PDCCH CSS and an E-PDCCH USS in a subframe allowed to carry an E-PDCCH (hereinafter, an E-PDCCH subframe) and in an L-PDCCH CSS and an L-PDCCH USS in a subframe not allowed to carry an E-PDCCH (hereinafter, a non-E-PDCCH subframe).

Like the L-PDCCH, the E-PDCCH delivers DCI. For example, the E-PDCCH may deliver DL scheduling information and UL scheduling information. An E-PDCCH/PDSCH operation and an E-PDCCH/PUSCH operation are performed in the same manner as/a similar manner to steps S107 and S108 of FIG. 1. That is, a UE may receive an E-PDCCH and receive data/control information on a PDSCH corresponding to the E-PDCCH. In addition, the UE may receive an E-PDCCH and transmit data/control information on a PUSCH corresponding to the E-PDCCH. In the legacy LTE system, a PDCCH candidate region (a PDCCH SS) is reserved in a control region and a PDCCH for a specific UE is transmitted in a part of the PDCCH SS. Therefore, a UE may detect its PDCCH in the PDCCH SS by blind decoding. Similarly, an E-PDCCH may also be transmitted in all or a part of reserved resources.

Figure 6:
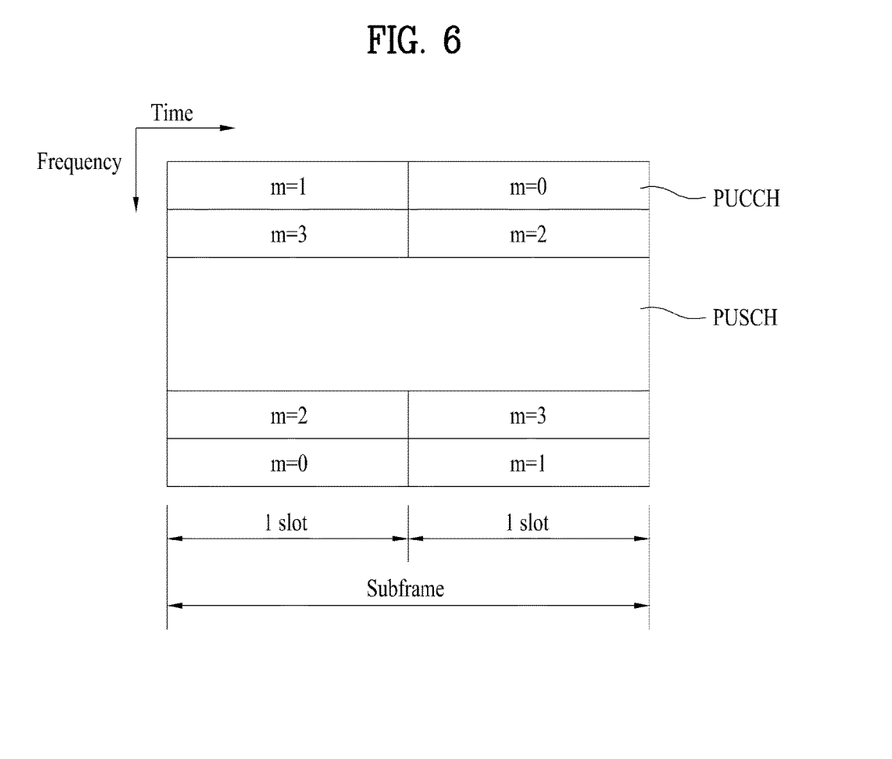
FIG. 6 illustrates an Uplink (UL) SF structure.

FIG. 6 illustrates a structure of a UL subframe in the LTE system.

Referring to FIG. 6, a UL subframe includes a plurality of slots (e.g. 2 slots). Each slot may include a different number of SC-FDMA symbols according to a Cyclic Prefix (CP) length. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary.

The PUCCH may carry the following control information.
Scheduling Request (SR): information used to request UL-SCH resources. The SR is transmitted in On-Off Keying (OOK).
HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. An HARQ ACK/NACK and an HARQ-ACK may be interchangeably used in the same meaning of an HARQ response.
Channel Quality Indicator (CSI): feedback information for a DL channel. MIMO-related feedback information includes an RI and a PMI. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

Table [5] illustrates a mapping relationship between PUCCH formats and UCI in the LTE system.

TABLE 5

| PUCCH format | Uplink Control Information (UCI) |
|---|---|
| format 1 | SR(Scheduling Request) (non-modulated waveform) |
| format 1a | 1-bit HARQ ACK/NACK (SR present/absent) |
| format 1b | 2-bit HARQ ACK/NACK (SR present/absent) |
| format 2 | CQI (20 coded bits) |
| format 2 | CQI and 1- or 2-bit HARQ ACK/NACK (20 bits) (only in case of extended CP) |
| format 2a | CQI and 1-bit HARQ ACK/NACK (20 + 1 coded bits) |
| format 2b | CQI and 2-bit HARQ ACK/NACK (20 + 2 coded bits) |

Figure 7:
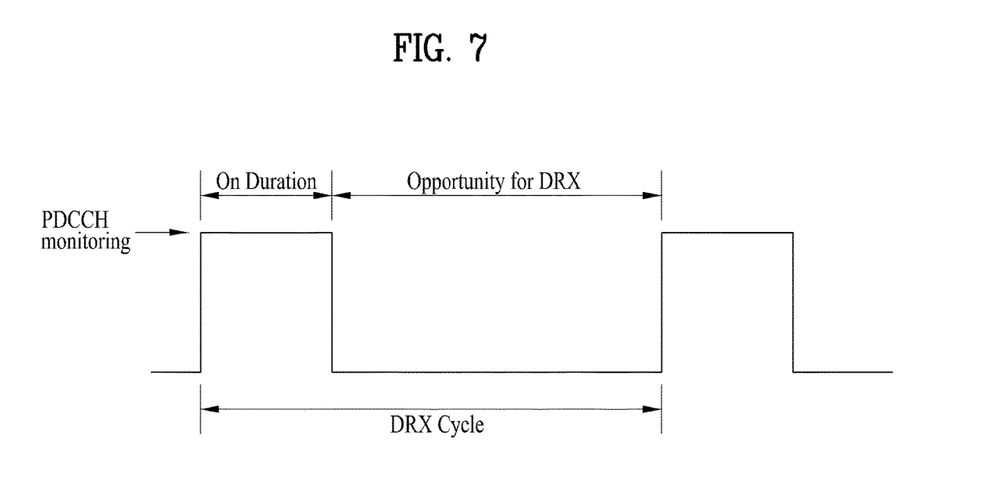
FIG. 7 is a conceptual diagram illustrating exemplary Discontinuous Reception (DRX).

FIG. 7 is a conceptual diagram illustrating Discontinuous Reception (DRX). User equipment (UE) may perform DRX to reduce power consumption. DRX may control PDCCH monitoring activation of the UE. Referring to FIG. 7, the DRX period may include one period denoted by "On duration" and the other period denoted by "Opportunity for DRX". In more detail, the UE may monitor PDCCH for the "On duration" period, and may not perform PDCCH monitoring during the "Opportunity for DRX" period. The PDCCH monitoring may include monitoring C-RNTI, TPC-PUCCH-RNTI, and TPC-PUSCH-RNT of the UE, and may further include monitoring SPS (Semi-Persistent Scheduling) C-RNTI of the UE (when configuration is achieved). If the UE is in the RRC (Radio Resource Control)_CONNECTED state and DRX is configured, the UE may perform discontinuous monitoring of PDCCH according to the DRX operation. Otherwise, the UE may perform continuous monitoring of the PDCCH. "onDurationTimer" and DRX cycle may be configured through RRC signaling (i.e., higher layer signaling). "onDurationTimer" may denote the number of successive PDCCH-subframes starting from the start time of the DRX cycle. In FDD, the PDCCH subframe may denote all subframes. In TDD, the PDCCH subframe may denote a subframe including both a downlink (DL) subframe and a DwPTS.

Figure 8:
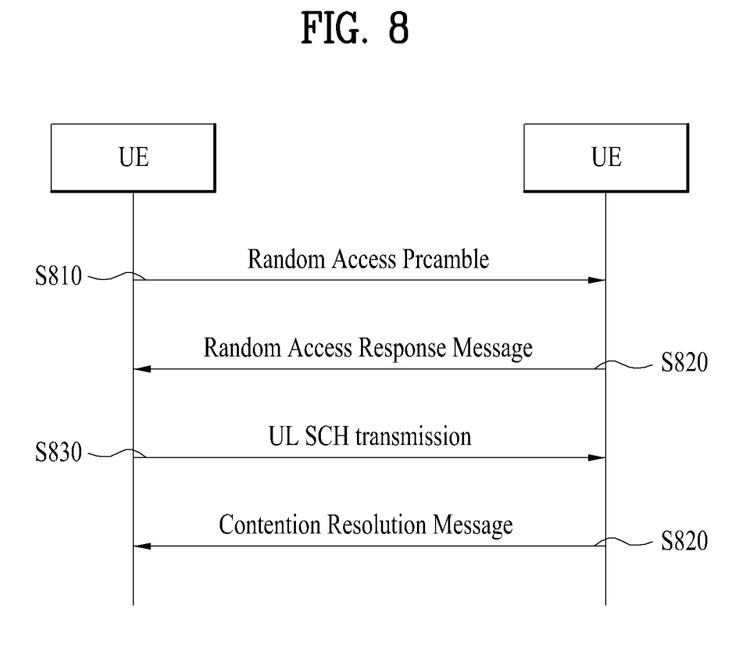
FIG. 8 is a conceptual diagram illustrating a Random Access Procedure (RAP).

FIG. 8 illustrates a random access procedure. The random access procedure is used to transmit UL short data. For example, upon occurrence of initial access in Radio Resource Control (RRC)_IDLE mode, initial access after Radio Link Failure (RLF), or handover requiring random access, or upon generation of UL/DL data requiring random access in RRC_CONNECTED mode, the random access procedure is performed. The random access procedure is performed in a contention-based manner or a non-contention-based manner.

Referring to FIG. 8, a UE receives random access information from an eNB by system information and stores the received random access information. Subsequently, when random access is needed, the UE transmits a random access preamble (message 1 or Msg1) to the eNB on a PRACH (S810). Upon receipt of the random access preamble from the UE, the eNB transmits a random access response message (message 2 or Msg2) to the UE (S820). Specifically, DL scheduling information for the random access response message is CRC-masked by a Random Access-RNTI (RA-RNTI) and transmitted on a PDCCH. Upon receipt of the DL scheduling signal masked by the RA-RNTI, the UE may receive the random access response message on a PDSCH. Then, the UE determines whether a Random Access Response (RAR) directed to the UE is included in the random access response message. The RAR includes a Timing Advance (TA), UL resource allocation information (a UL grant), a temporary UE ID, etc. The UE transmits a UL-SCH message (message 3 or Msg3) to the eNB according to the UL grant (S830). After receiving the UL-SCH message, the eNB transmits a contention resolution message (message 4 or Msg4) to the UE (S840).

Figure 9:
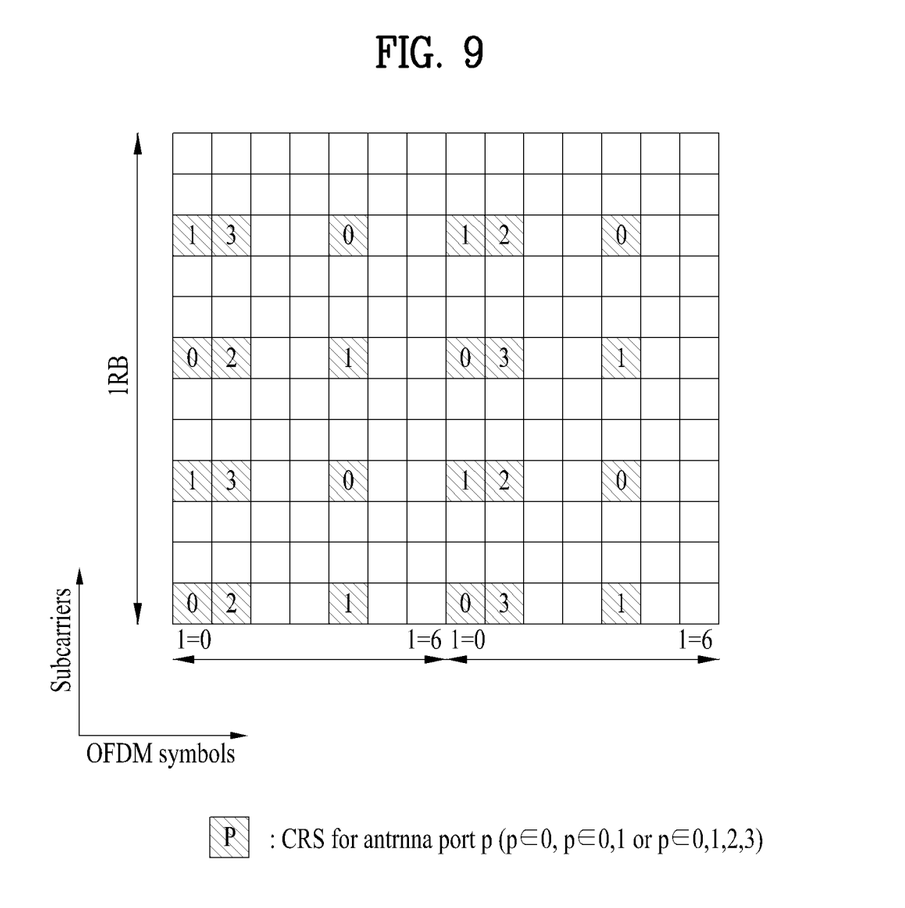
FIG. 9 is a conceptual diagram illustrating Cell-specific Reference Signal (CRS).

FIG. 9 is a conceptual diagram illustrating a CRS. Referring to FIG. 9, CRS may be transmitted through the antenna ports 0~3. One antenna (P=0), two antennas (P=0, 1), or four antennas (P=0, 1, 2, 3) may be supported according to base stations (BSs). FIG. 9 illustrates the CRS structure used when a maximum of 4 antennas is supported. In the LTE system, CRS is used not only for demodulation but also for measurement. CRS may be transmitted throughout the entire band in all DL subframes supporting PDSCH transmission, and may be transmitted through all antenna ports configured in the BS. In the meantime, CRS is transmitted through the entire band for each subframe, resulting in high RS overhead.

Embodiment: Signal Transmission/Processing for MTC (Machine Type Communication)

The next generation LTE-A system considers a method for constructing low-priced/low-specification UEs based on data communication, such as meter reading, water level measurement, surveillance camera use, reporting of vending machines stock, etc. For convenience of description, the above UE will hereinafter be referred to as an LC UE type (or LC-type UE, LC UE, or MTC UE). The LC UE has a small amount of Tx data and UL/DL data Tx/Rx occasionally occurs, such that reducing UE cost and increasing battery lifespan according to a low data transfer rate is considered efficient. In addition, the LC UE type is characterized in that mobility is low and the channel environment is almost unchanged. Various coverage enhancement methods for respective channels/signals have been intensively discussed in consideration of poor situations in which the next generation LC UE is installed in a coverage-limited place such as a building, a factory, a basement, etc. For example, a method for repeatedly transmitting channels and/or signals to improve MTC coverage has been intensively discussed.

In the meantime, in the legacy system, a user equipment (UE) performs Radio Link Monitoring (RLM) and Radio Resource Management (RRM) operations to measure/report/manage a radio link state and receive (Rx) signal quality. The UE may perform RRC connection reestablishment, handover, cell reselection, cell measurement, etc. according to RLM/RRM.

In the case of RLM, the UE may monitor the downlink (DL) radio link quality of the serving cell (e.g., Primary Cell:PCell) on the basis of the CRS. In more detail, the UE may estimate the radio link quality in a single subframe on the basis of the CRS, may compare the estimated value (e.g., SNR (Signal to Noise Ratio) or SINR (Signal to Interference and Noise Ratio)) with a threshold value (Qout or Qin), and may monitor and/or estimate the radio link state (e.g., out-of-sync or in-sync). If the radio link state is the in-sync state, the UE may normally communicate with the BS or may maintain such communication with the BS. If the radio link state is the out-of-sync state, the UE may decide the radio link failure, and may perform RRC connection reestablishment, handover, cell reselection, cell measurement, etc. Qout may be defined as a specific level at which the DL radio link is not reliably received, and may correspond to 10% of BLER (Block Error Rate) of hypothetical PDCCH transmission in consideration of the PCFICH error on the assumption of the parameters shown in Table 6. The threshold value (Qin) may be defined as a specific level at which the DL radio link can be significantly and reliably received, and may correspond to 2% of PDCCH BLER of hypothetical PDCCH transmission in consideration of the PCFICH error on the assumption of the parameters shown in Table 7. Subframe(s) in which RLM is performed may be limited through higher layer signaling (e.g., RRC signaling).

Table 6 shows PDCCH/PCFICH Tx parameters for the out-of-sync state, and Table 7 shows PDCCH/PCFICH Tx parameters for the in-sync state.

TABLE 6

| Attribute | Value |
| --- | --- |
| DCI format | 1A |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4; Bandwidth = 1.4 MHz<br>8; Bandwidth ≥ 3 MHz |
| Ratio of PDCCH RE energy to average RS RE energy | 4 dB; when single antenna port is used for cell-specific reference signal transmission by the PCell.<br>1 dB: when two or four antenna ports are used for cell-specific reference signal transmission by the PCell. |

TABLE 6-continued

| Attribute | Value |
| --- | --- |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

Note 1:
DCI format 1A.
Note 2:
A hypothetical PCFICH transmission corresponding to the number of control symbols shall be assumed.

TABLE 7

| Attribute | Value |
| --- | --- |
| DCI format | 1C |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4 |
| Ratio of PDCCH RE energy to average RS RE energy | 0 dB; when single antenna port is used for cell-specific reference signal transmission by the PCell.<br>−3 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

Note 1:
DCI format 1C.
Note 2:
A hypothetical PCFICH transmission corresponding to the number of control symbols shall be assumed.

A physical layer of the UE may monitor the DL radio link quality of the serving cell (e.g., PCell), and may inform a higher layer (e.g., RRC) of the out-of-sync/in-sync states. In more detail, if the radio link quality is better than Qin, the UE physical layer may inform the higher layer of a radio frame, in which the radio link quality is estimated, of the in-sync state. In the non-DRX mode, the UE physical layer may estimate the radio link quality for each radio frame. And, in the DRX mode, the UE physical layer may estimate the radio link quality at least one time for each DRX period. If higher layer signaling indicates subframe(s) for (re-stricted) RLM, estimation of the radio link quality is not performed in the non-indicated subframe. Thereafter, if the radio link quality is less than Qout, the UE physical layer may inform the higher layer in a radio frame, in which the radio link quality is estimated, of the out-of-sync state.

In the case of RRM, the UE may calculate RSRP (Reference Signal Received Power)/RSSI (Received Signal Strength Indication)/RSRQ (Reference Signal Received Quality) based on a received signal power in a single subframe, wherein the received signal power is measured on the basis of a CRS transmission RE and/or CRS transmission OFDM symbol in association with a given time/frequency domain (e.g., a predetermined subframe/band), and may monitor the Rx signal quality on the basis of the calculated result. RSRP may be defined as linear average of power contribution (in units of W) of resource elements (REs) carrying the CRS in a measurement frequency band. CRS of the antenna port #0 may be used to decide the RSRP. If the UE can reliably detect the CRS of the antenna port #1, the UE may additionally use the CRS of the antenna port #1 so as to decide the RSRP. RSRQ may be defined as N×RSRP/RSSI. N may denote the number of RBs contained in the RSSI measurement band. RSRP and RSSI may be measured in the same RB set. RSSI may indicate linear average of total Rx power observed at the OFDM symbol including the CRS of the antenna port #0 within the measurement band (N RBs), and may include signals of all sources observed by the UE. For example, the source may include the co-channel serving and non-serving cell, and may further include neighbor channel interference and thermal noise. If higher layer signaling (e.g., RRC signaling) indicates a specific subframe for RSRQ measurement, RSSI may be measured in all OFDM symbols of the indicated subframe.

Iterative transmission may be applied to a physical channel in consideration of coverage improvement of a specific UE such as LC UE type or the like. For example, the channel (e.g., PDCCH, PDSCH) having the same information/content may be repeatedly transmitted throughout a plurality of subframes. In this case, assuming that the legacy RLM/RRM operation based on the radio link quality or the Rx signal power of the single subframe remains unchanged, monitoring of the radio link state and the Rx signal quality may not be stably and efficiently carried out. For example, assuming that PDCCH/PDSCH transmission is repeated, the measured/calculated values about an Rx signal combined throughout the plurality of subframes, instead of the measured/calculated values about an Rx signal of the single subframe, may be considered as the appropriately/efficiently required S(I)NR and Rx power (SNR or SINR will hereinafter only be referred to as SINR).

RLM and RRM operations/methods for use in the case in which repetition-based signal transmission is applied (for example, for coverage improvement) are proposed. For convenience of description, the number of repetition times needed for control channel (e.g., PDCCH) transmission is defined as Nc, and the number of repetition times needed for data channel (e.g., PDSCH) transmission is defined as Nd. In addition, the term "UE" may refer to an arbitrary UE (including the LC UE type) in which iterative transmission is applied to specific physical control/data channels so as to implement coverage improvement.

RLM (RLM Based on Combined Signal Over Multiple SFs)

In accordance with the present invention, the UE may perform combining of specific signals (e.g., CRS) received through L SFs (where L>1), and may perform RLM on the basis of the combined signal (hereinafter referred to as the combined L-signal). In more detail, the UE may measure the radio link quality (e.g., SINR) using the combined L-signal, and may monitor/estimate the radio link state (e.g., the out-of-sync or in-sync state) by comparing the measurement result with Qout or Qin. The combined L-signal may be provided by combining specific signals (e.g., CRS) received through L SFs are combined in a stage/state (e.g., modulation symbol stage/state) after channel compensation.

L SFs may be randomly established by the UE, may be designated by the network (e.g., BS or eNB), or may be defined in advance. For example, L (and/or the SF set corresponding thereto) may be defined in advance, or may be signaled through PBCH, SIB, and RRC signals. In addition, the UE may consider and/or use the number (Nc) of PDCCH repetitions (and/or the SF set corresponding thereto) to be L (and/or the SF set corresponding thereto), without additional signaling. In addition, L (and/or the SF set corresponding thereto) assumed/used when the out-of-sync state and the in-sync state are decided may be independently configured and/or defined. For example, when the out-of-sync state is decided, Los (and/or the SF set corresponding thereto) may be used. When the in-sync state is decided, Lin (and/or the SF set corresponding thereto) may be configured/defined such that Lin can be used. In addition, L (and/or the SF set corresponding thereto) may be independently configured and/or defined per PRACH resource (set) and/or per UE coverage improvement requirement amount (e.g., measured pathloss, required SINR, etc.).

In the meantime, assuming that the radio link quality (e.g., SINR) is measured on the basis of a specific signal (e.g., CRS) received through L SFs, the signal term and the interference term may be calculated in different ways as follows (e.g., SINR=signal term/interference term). First of all, in the case of the signal term, after signals (e.g., signals in the modulation symbol stage/state) calculated in each SF are combined throughout L SFs, the signal term value may be determined using the power value (or the multiplication result of the weighting factor) related to the final combined result. In contrast, in the case of the interference term, a separate interference power value is calculated in each SF, and the interference term value may be determined using the resultant value (or the multiplication value of the weighting factor) obtained by adding separate interference power values throughout the L SFs. The interference term may include interference component and/or noise component.

In the meantime, assuming that the iterative scheme is applied to a specific channel (e.g., PDCCH) transmission (under the coverage limited situation), and/or assuming that PCFICH detection/reception is omitted (e.g., when CFI information is separately signaled), the UE may not consider the PCFICH error when deciding Qout and Qin (or a target PDCCH BLER corresponding to Qout or Qin). That is, assuming that there is no PCFICH error, Qout and/or Qin corresponding to the target PDCCH BLER value may be used as necessary. In addition, PDCCH/PCFICH information (e.g., the number of OFDM symbols (sections: namely CFIs) needed for control channel transmission information, and/or CCE PDCCH aggregate level, etc.) assumed/used when the out-of-sync and in-sync states are decided in the RLM process may be defined in advance, or may be separately signaled through PBCH, SIB, RRC signals, etc. PDCCH/PCFICH information may be independently configured/defined per PRACH resource (set) and/or per UE coverage improvement requirement amount (e.g., measured pathloss, required SINR, etc.).

In another method, assuming that the iterative scheme is applied to specific channel (e.g., PDCCH) transmission (under the coverage limited situation), the operation for measuring/calculating the radio link quality may be performed in the same manner as in the conventional (e.g., 3GPP Rel-10) RLM scheme (i.e., the value regarding the single SF may be measured and calculated), a target PDCCH BLER needed to decide Qout and Qin may increase. For example, the BLER value corresponding to Qout may be higher than 10%, and the BLER value corresponding to Qin may be defined to be higher than 2%. Target PDCCH BLER associated information (or values) respectively corresponding to Qout and Qin may be defined in advance, or may be separately signaled through PBCH, SIB, RRC signals, etc. The target PDCCH BLER associated information may be independently configured/defined per PRACH resource (set) and/or per UE coverage improvement requirement amount (e.g., measured pathloss, required SINR, etc.).

Figure 10:
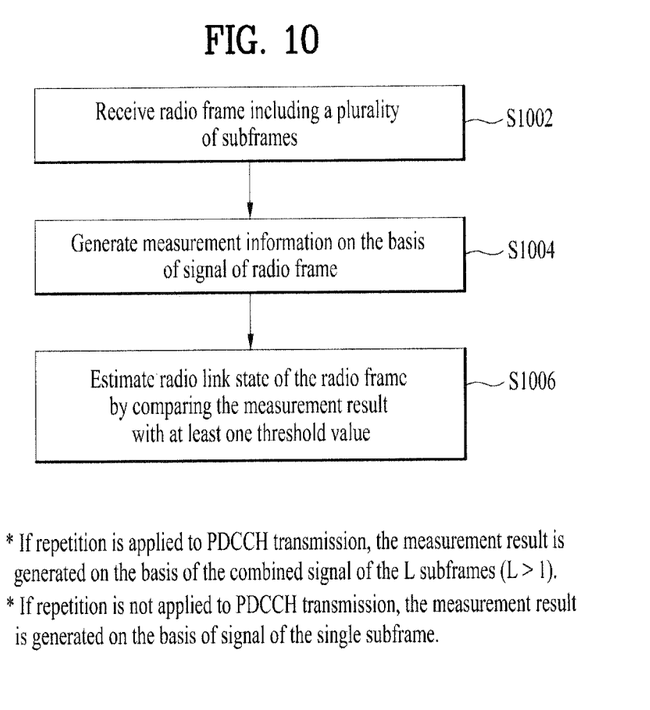
FIG. 10 is a conceptual diagram illustrating a method for monitoring a radio link according to an embodiment of the present invention.

FIG. 10 is a conceptual diagram illustrating a radio link monitoring method according to one embodiment of the present invention. Referring to FIG. 10, the UE may receive one or more radio frames, and each radio frame may include a plurality of subframes in step S1002. Thereafter, the UE may generate the measurement result on the basis of signals of the radio frame in step S1004, and may estimate the radio link state of the radio frame by comparing the measurement result with one or more threshold values in step S1006. In this case, assuming that repetition (or iteration) is applied to control channel (e.g., PDCCH) transmission, the measurement result may be generated on the basis of the combined signal of the L subframes (where L>1). The operation for generating the measurement result on the basis of the combined signal may be carried out using the above-mentioned proposed methods. In the meantime, assuming that repetition (or iteration) is not applied to control channel (e.g., PDCCH) transmission, the measurement result may be generated on the basis of the signal of the single subframe in the same manner as in the legacy RLM operation. Assuming that the radio link state is the in-sync state, the UE may normally communicate with the BS and/or may maintain normal communication with the BS. If the radio link state is the out-of-sync state, the UE may decide the occurrence of RLF (Radio Link Failure) in the radio link, and the UE may also perform the RRC connection reestablishment process. If the RRC connection reestablishment process has failed, the UE may transition to the RRC_IDLE state and may select a new cell.

RRM (RRM Based on Combined Signal Over Multiple SFs)

In accordance with this method, after the UE combines specific resources (e.g., CRS transmission RE) received throughout R SFs (where R>1), the Rx RS power (e.g., the combined R-signal power) is measured on the basis of the combined signal (hereinafter referred to as the combined R signal), such that RSRP can be obtained. In addition, after the UE combines specific symbols (e.g., CRS transmission OFDM symbol or all OFDM symbols) received throughout the same R SFs used for RSRP measurement, the received signal strength (e.g., a power value of the combined S-signal) received on the basis of the combined signal (hereinafter referred to as the combined S-signal) is calculated, such that RSSI can be obtained. RSSI may be used for RSRQ. As described above, RSRQ may be defined as N×RSRP/RSSI. N may denote the number of RBs contained in the RSSI measurement band, and RSRP and RSSI may be measured in the same RB set. The combined L-signal and the combined S-signal may be obtained by combining specific resources (e.g., CRS transmission RE) and specific symbols (e.g., CRS transmission OFDM symbol or all OFDM symbols) received through R SFs, respectively, in a stage/step (i.e., modulation symbol stage/status) after the channel estimation.

R SFs may be randomly established by the UE, may be designated by the network (e.g., BS or eNB), or may be defined in advance. For example, R (and/or the SF set corresponding thereto) may be defined in advance, or may be signaled through PBCH, SIB, RRC signals, etc. In addition, the UE may consider and/or use the number (Nd) of PDSCH repetitions (and/or the SF set corresponding thereto) to be R (and/or the SF set corresponding thereto), without additional signaling. In addition, R (and/or the SF set corresponding thereto) may be independently configured and/or defined per PRACH resource (set) and/or per UE coverage improvement requirement amount (e.g., measured pathloss, required SINR, etc.).

In the meantime, assuming that repetition is applied to specific channel (e.g., PDSCH) transmission (under the coverage limited situation), RSRP may be measured/calculated on the basis of the combined R-signal throughout R SFs, and RSSI may be measured/calculated on the basis of the signal of the single SF in the same manner as in the legacy (e.g., 3GPP Rel-10) RRM scheme. In contrast, RSRP may be measured/calculated on the basis of the signal of the single SF in the same manner as in the legacy RRM scheme, and RSSI may be measured/calculated on the basis of the combined S-signal throughout R SFs.

In the meantime, assuming that the DRX operation is established to perform power saving of a specific UE such as the LC UE type (under the coverage limited situation) (as shown in FIG. 7), the wake-up time duration (i.e., on duration) of the DRX pattern may be determined in consideration of the number of repetition times of a specific channel (e.g., PDCCH, PDSCH) so as to perform stable/efficient RLM/RRM. For example, the wake-up time section size (e.g., the number of SFs, ms) may be identical to or larger than the repetition parameter value (e.g., Nc, max(Nc, Nd), min(Nc,Nd) or Nd) for channel transmission. In more detail, the final wake-up time section size may be determined on the basis of a first value obtained when the repetition parameter is added to or multiplied by the wake-up time section parameters established through the legacy higher layer signaling.

Figure 11:
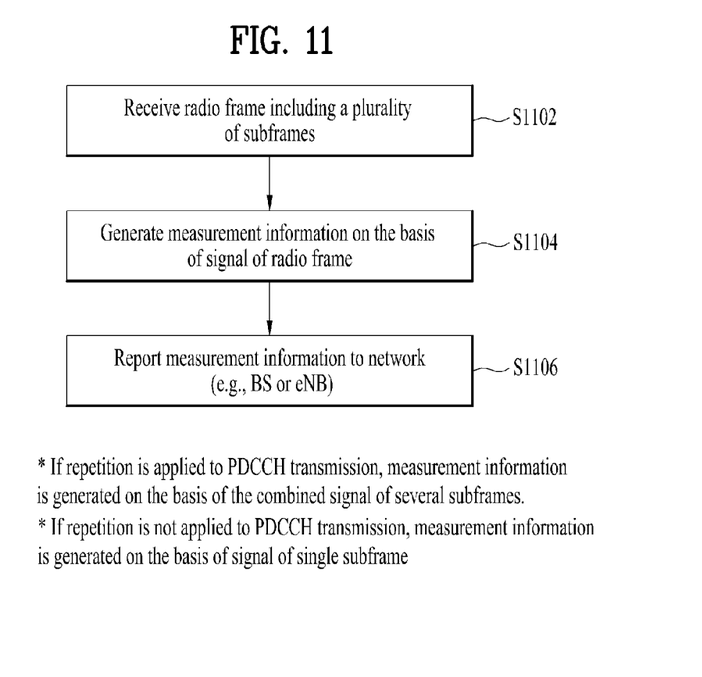
FIG. 11 is a conceptual diagram illustrating a method for reporting channel measurement according to an embodiment of the present invention.

FIG. 11 is a flowchart illustrating a channel measurement reporting method according to an embodiment of the present invention. Referring to FIG. 11, the UE may receive one or more radio frames, and each radio frame may include a plurality of subframes in step S1102. Thereafter, the UE may generate measurement information (e.g., RSRP, RSRQ and/or RSSI) on the basis of the signal of the radio frame in step S1104, and may report measurement information to the network (e.g., BS or eNB) in step S1106. The measurement information may be transmitted through RRC layering. In this case, assuming that repetition is applied to data/share channel (e.g., PDSCH) transmission, the measurement information may be generated on the basis of the combined signal on the plurality of subframes. The operation for generating measurement information on the basis of the combined signal may be carried out using the above-mentioned methods. Assuming that repetition is not applied to data/shared channel (e.g., PDSCH), the measurement information may be generated on the basis of the signal of the single subframe in the same manner as in the legacy RRM operation.

Figure 12:
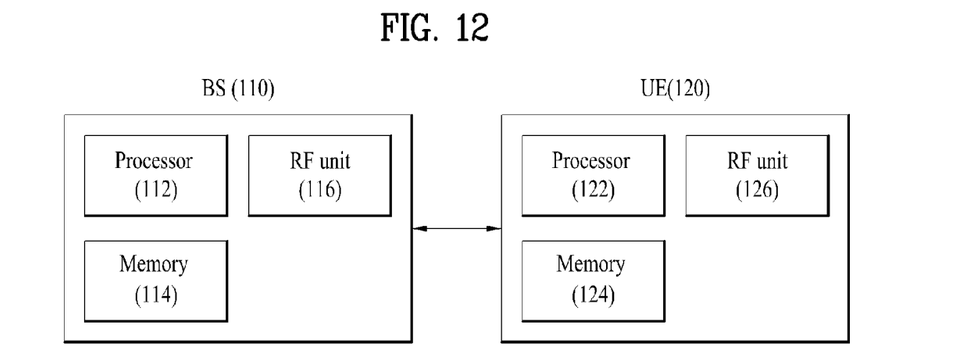
FIG. 12 is a block diagram of a Base Station (BS) and a User Equipment (UE) according to an embodiment of the present invention.

FIG. 14 is a block diagram of a BS and a UE which are applicable to an embodiment of the present invention.

Referring to FIG. 14, a wireless communication system includes a BS 110 and a UE 120. A transmitter is a part of the BS 110 and a receiver is a part of the UE 120 on DL. A transmitter is a part of the UE 120 and a receiver is a part of the BS 110 on UL. The BS 110 includes a processor 112, a memory 114, and a Radio Frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE may have a single antenna or multiple antennas.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS or network nodes other than the BS. The term 'BS' may be replaced with the term fixed station, Node B, evolved Node B (eNode B or eNB), Access Point (AP), etc. The term 'terminal' may be replaced with the term UE, Mobile Station (MS), Mobile Subscriber Station (MSS), Subscriber Station (SS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a method and apparatus for performing communication, when MTC is supported in a wireless communication system.

The invention claimed is:

1. A method for monitoring a radio link by a user equipment (UE) in a wireless communication system, the method comprising:
receiving a radio frame including a plurality of subframes;
generating a measurement result based on a signal on the radio frame using an expression {signal term/interference term}; and
estimating a radio link state of the radio frame by comparing the measurement result with at least one threshold value,
wherein, when repetition is applied to a physical downlink control channel (PDCCH) transmission, the measurement result is generated so that the signal term is determined using a power value related to a combined signal on L subframes, where L is identical to a number of repetition times of the PDCCH transmission and is more than 1, and the interference term is determined using a value obtained by adding interference power values of respective subframes throughout the L subframes, and
wherein, when the repetition is not applied to the PDCCH transmission, the measurement result is generated based on a signal on a single subframe.

2. The method according to claim 1, wherein the L subframes are identical to a subframe set configured in a manner that PDCCH transmission is repeated.

3. The method according to claim 1, wherein the combined signal includes a signal obtained by combining signals on the L subframes in a modulation symbol state.

4. A user equipment (UE) for use in a wireless communication system, the UE comprising:
a radio frequency (RF) unit; and
a processor,
wherein the processor receives a radio frame including a plurality of subframes, generates a measurement result based on a signal on the radio frame using an expression {signal term/interference term}, and estimates a radio link state of the radio frame by comparing the measurement result with at least one threshold value,
wherein, when repetition is applied to a physical downlink control channel (PDCCH) transmission, the measurement result is generated so that the signal term is determined using a power value related to a combined signal on L subframes, where L is identical to a number of repetition times of the PDCCH transmission and is more than 1, and the interference term is determined using a value obtained by adding interference power values of respective subframes throughout the L subframes, and
wherein, when the repetition is not applied to the PDCCH transmission, the measurement result is generated based on a signal on a single subframe.

5. The UE according to claim 4, wherein the L subframes are identical to a subframe set configured in a manner that PDCCH transmission is repeated.

6. The UE according to claim 4, wherein the combined signal includes a signal obtained by combining signals on the L subframes in a modulation symbol state.

* * * * *